(12) United States Patent
Chang et al.

(10) Patent No.: US 8,449,149 B2
(45) Date of Patent: May 28, 2013

(54) ILLUMINATION APPARATUS

(75) Inventors: Hsuen-Chih Chang, Changhua (TW);
Hung-Lieh Hu, Hsinchu (TW);
Sheng-Pan Huang, Changhua County
(TW); Chiu-Ling Chen, Hsinchu
County (TW); Chen-Kun Chen,
Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 375 days.

(21) Appl. No.: 12/133,668

(22) Filed: Jun. 5, 2008

(65) Prior Publication Data

US 2009/0225551 A1 Sep. 10, 2009

(30) Foreign Application Priority Data

Mar. 7, 2008 (TW) .............................. 97108177 A

(51) Int. Cl.
*F21V 3/00* (2006.01)
*F21V 5/00* (2006.01)
*E01F 9/00* (2006.01)

(52) U.S. Cl.
USPC ................... 362/311.06; 362/153.1; 362/336

(58) Field of Classification Search
USPC .................................. 362/311.06, 153.1, 336
See application file for complete search history.

(56) References Cited

U.S. PATENT DOCUMENTS

| 3,766,375 | A | 10/1973 | Edman et al. | |
|---|---|---|---|---|
| 3,775,605 | A | 11/1973 | Rijnders | |
| 4,041,306 | A | 8/1977 | Compton et al. | |
| 4,096,555 | A | 6/1978 | Lasker | |
| 4,358,816 | A | 11/1982 | Soileau | |
| 4,651,260 | A | 3/1987 | Lasker | |
| 6,837,605 | B2 | 1/2005 | Reill | |
| 7,473,014 | B2 * | 1/2009 | Katoh et al. | 362/332 |
| 7,566,147 | B2 * | 7/2009 | Wilcox et al. | 362/249.02 |
| 7,674,018 | B2 * | 3/2010 | Holder et al. | 362/311.06 |
| 8,240,886 | B2 * | 8/2012 | Lai | 362/309 |
| 8,348,462 | B2 * | 1/2013 | Vasta et al. | 362/249.02 |
| 2007/0201225 | A1 * | 8/2007 | Holder et al. | 362/227 |
| 2007/0285920 | A1 * | 12/2007 | Seabrook | 362/240 |
| 2008/0239722 | A1 * | 10/2008 | Wilcox | 362/268 |

FOREIGN PATENT DOCUMENTS

| CN | 1657818 A | 8/2005 |
|---|---|---|
| TW | 582493 | 4/2004 |
| TW | M325517 | 1/2008 |

OTHER PUBLICATIONS

Office Action issued on Mar. 11, 2010 in China.

\* cited by examiner

*Primary Examiner* — Jong-Suk (James) Lee
(74) *Attorney, Agent, or Firm* — Tracy M. Heims; Apex Juris, PLLC

(57) ABSTRACT

An illumination apparatus including a light-emitting unit and a lens module is described. The light-emitting unit is used for generating a light and has a light exit axis. The lens module has a light exit surface with a plurality of curved surfaces. The lens module receives the light and outputs the light from the curved surfaces. Further, the curved surfaces have at least two curvatures, each for adjusting a illumination range of the light output from the corresponding curved surface.

13 Claims, 12 Drawing Sheets

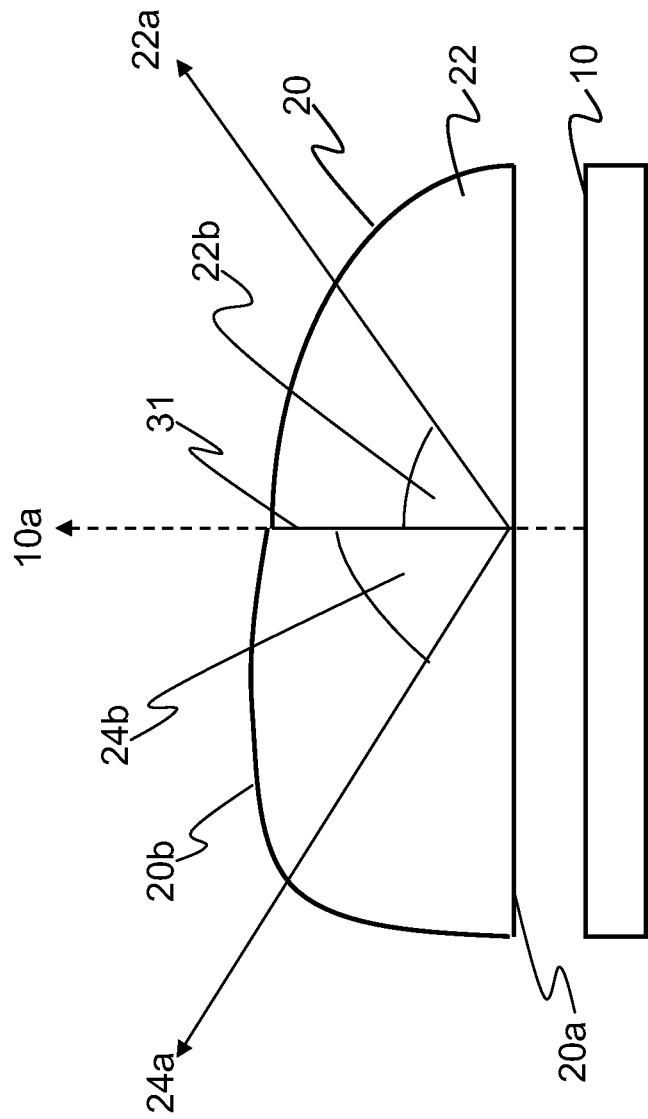

US 8,449,149 B2

ILLUMINATION APPARATUS

CROSS-REFERENCE TO RELATED APPLICATIONS

This non-provisional application claims priority under 35 U.S.C. §119(a) on Patent Application No. 097108177 filed in Taiwan, R.O.C. on Mar. 7, 2008 the entire contents of which are hereby incorporated by reference.

BACKGROUND OF THE INVENTION

1. Field of Invention

The present invention relates to an illumination apparatus, and more particularly to an asymmetrical illumination apparatus.

2. Related Art

The main purpose of street lighting is to enhance and guarantee night traffic safety. For driving, street lighting enables drivers to see the forward visual field more clearly, so as to take safety measures timely within an appropriate distance. This safety distance is closely related to the street lighting, the speed of the vehicle, the road condition, the performance of the vehicle, and the reaction capacity of the driver. However, seen from the illumination design point, the street lighting and the speed of the vehicle are the most critical.

Glare, a phenomenon that the light within the visual field of a human eye causes discomfort or blurred vision, is one of the factors that affect the quality of the street lighting. The conventional illumination apparatus of a street lamp has a light intensity peak value distributed at an angle of 60° from a vertical direction, so that the light may be irradiated straightforward into the human eye to form a direct glare. As a result, the driver may easily feel an eye fatigue and will be in a dangerous situation. Moreover, the conventional light source usually forms symmetrically shapes of circles or ellipses on the road surface. If a large range of the road surface is to be lighted, plenty of lights will be projected on places outside the road surface to cause light waste and pollution. Further, if the irradiated light form is to be adjusted by a reflector, a deeper reflector is required to get a satisfactory result, but the weight and size of the lamp will be huge.

Referring to US Patent Publication No. 3,766,375, prisms disposed on a reflector and a lampshade are used to adjust the light form to match a conventional light bulb, so as to produce an asymmetrical light field distribution.

Referring to US Patent Publication No. 3,775,605, No. 4,041,306, No. 4,096,555, No. 4,358,816, and No. 4,651,260, various reflective lampshades in different structures are used for reflecting to match a conventional light bulb, so as to produce an asymmetrical light field distribution.

SUMMARY OF THE INVENTION

Accordingly, the present invention is directed to an illumination apparatus. A lens package structure with various curvatures is adopted to form illumination ranges at different angles, and also narrow down the light illumination angle in the moving direction of the vehicle so as to prevent the light from the street lighting being directly irradiated into the visual field of the driver. Thereby, the glare problem can be eliminated.

Therefore, the present invention provides an illumination apparatus including a light-emitting unit and a lens module. The light-emitting unit is used for generating a light and has a light exit axis. The lens module, disposed on one side of the light-emitting unit or wrapping the light-emitting unit, has a light exit surface formed with a plurality of curved surfaces in different curvatures. A first borderline of the adjacent curved surfaces passes through the light exit axis or offsets from the light exit axis. The lens module receives the light generated by the light-emitting unit, and forms different illumination ranges with the light output from the light exit surface according to the varied curvatures.

In the present illumination apparatus, a lens package structure with various curvatures is combined with a light-emitting unit, so as to reduce the weight and volume of the illumination apparatus. Moreover, the lens package structure with various curvatures can be used to provide illumination ranges at different angles.

BRIEF DESCRIPTION OF THE DRAWINGS

The present invention will become more fully understood from the detailed description given herein below for illustration only, and thus are not limitative of the present invention, and wherein:

FIG. 2C is a second side view of the second embodiment of the present invention;

DETAILED DESCRIPTION OF THE INVENTION

Figure 1A:
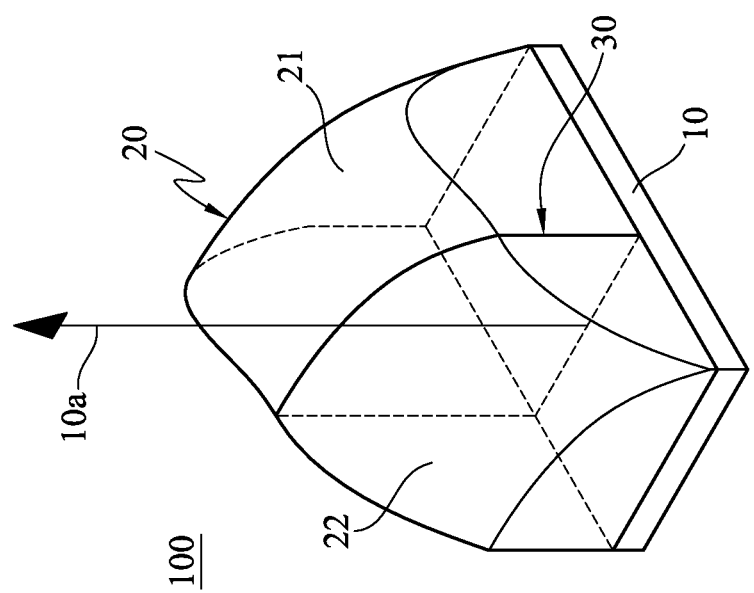
FIG. 1A is a schematic three-dimensional view of a first embodiment of the present invention.

Referring to FIG. 1A, a schematic three-dimensional view of a first embodiment of the present invention is shown. In FIG. 1A, a illumination apparatus 100 of the present invention includes a light-emitting unit 10 and a lens module 20. The lens module 20 has a first curved surface 21 and a second curved surface 22 separated from each other by a first borderline 30.

Figure 1B:
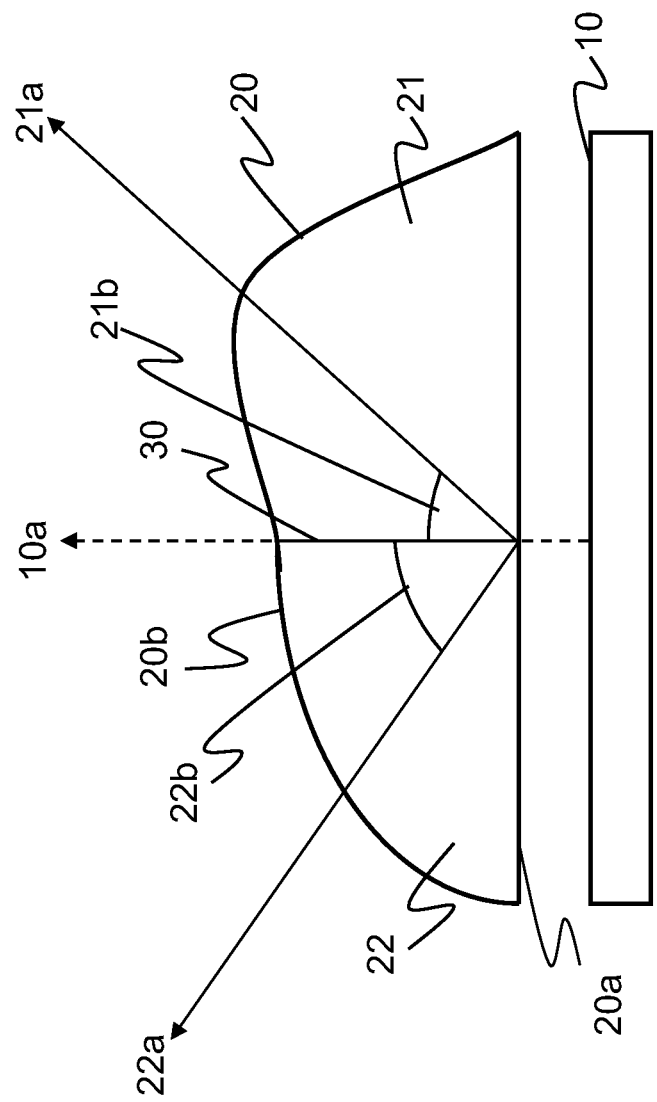
FIG. 1B is a schematic side view of the first embodiment of the present invention.

Referring to FIG. 1B, a side view of the first embodiment of the present invention is shown. In FIG. 1B, the light-emitting unit 10 and the lens module 20 are separated for the ease of illustration and may also be joined together upon actual requirements. The light-emitting unit 10 is disposed on one side of the lens module 20, and those skilled in the art can also dispose the light-emitting unit 10 in the lens module 20, i.e., the lens module 20 wraps the light-emitting unit 10. The light-emitting unit 10 is used for generating a plurality of lights, and has a light exit axis 10*a* representing the main traveling direction of the lights generated by the light-emitting unit 10. The light-emitting unit 10 may be, for example, a light-emitting diode, incandescent lamp, or gas discharge lamp.

The lens module 20 has a light entrance surface 20*a* and a light exit surface 20*b*. The light exit surface 20*b* has a first curved surface 21 and a second curved surface 22 with different curvatures. The first borderline 30 between the first curved surface 21 and the adjacent second curved surface 22 passes through the light exit axis 10*a* or offsets from the light exit axis 10*a*. In other words, the first borderline 30 does not have to be aligned with the light exit axis 10*a*. The light entrance surface 20*a* receives the lights and forms different illumination ranges with the lights output from the light exit surfaces 20*b* according to the varied curvatures. The illumination ranges can be adjusted by changing the curvatures of the light exit surface 20*b*. The first curved surface 21 has a first optical axis 21*a*, and a first angle 21*b* is formed between the first optical axis 21*a* and the light exit axis 10*a*. The first optical axis 21*a* is defined by the output light intensity distribution of the first curved surface 21, for example, the direction represented by the peak value of the output light intensity of the first curved surface 21. The second curved surface 22 has a second optical axis 22*a*, and a second angle 22*b* is formed between the second optical axis 22*a* and the light exit axis 10*a*. The second optical axis 22*a* is defined by the output light intensity distribution of the second curved surface 22, for example, the direction represented by the peak value of the output light intensity of the second curved surface 22. The first angle 21*b* formed between the first optical axis 21*a* and the light exit axis 10*a* is smaller than the second angle 22*b* formed between the second optical axis 22*a* and the light exit axis 10*a*. The lens module 20 is made of a light transmissive material, such as glass, plastic, silica gel, or water.

Figure 2A:
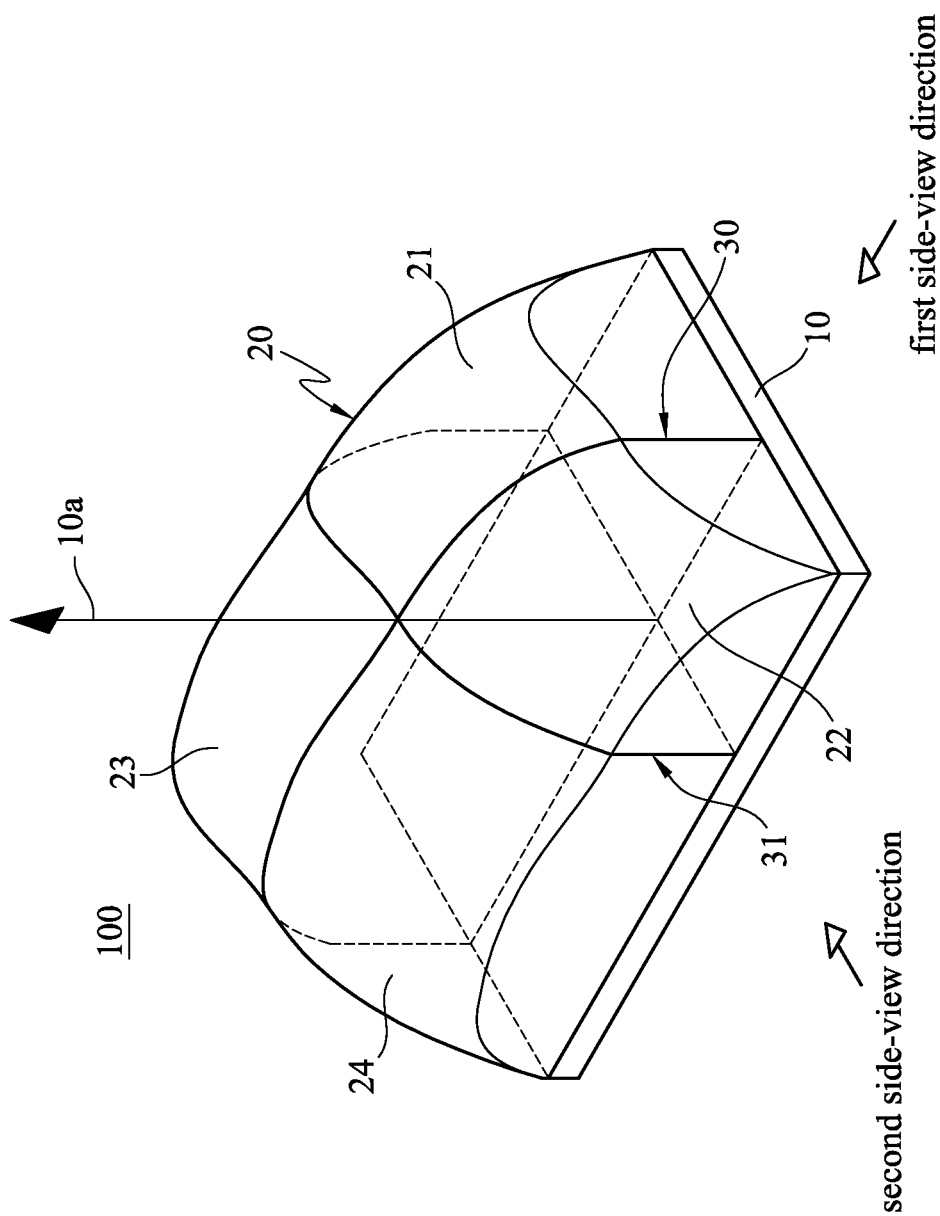
FIG. 2A is a schematic three-dimensional view of a second embodiment of the present invention.

Referring to FIG. 2A, a schematic three-dimensional view of a second embodiment of the present invention is shown. In FIG. 2A, the illumination apparatus 100 of the present invention includes a light-emitting unit 10 and a lens module 20. The lens module 20 has a first curved surface 21, a second curved surface 22, a third curved surface 23, and a fourth curved surface 24. The first curved surface 21 is separated from the second curved surface 22 by a first borderline 30, and the third curved surface 23 is separated from the fourth curved surface 24 by the first borderline 30. The first curved surface 21 is separated from the third curved surface 23 by a second borderline 31, and the second curved surface 22 is separated from the fourth curved surface 24 by the second borderline 31. The first borderline 30 and the second borderline 31 are crossed, and the first curved surface 21, the second curved surface 22, the third curved surface 23, and the fourth curved surface 24 with different curvatures are disposed on both sides of the second borderline 31.

Figure 2B:
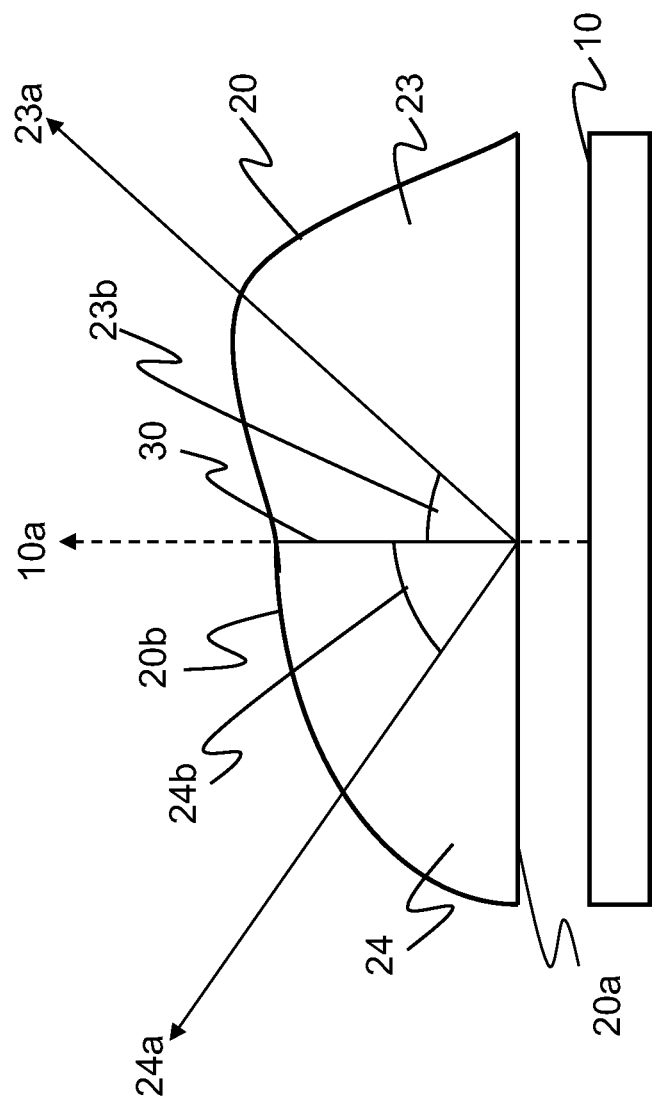
FIG. 2B is a first side view of the second embodiment of the present invention.

Referring to FIG. 2B, a first side view of the second embodiment of the present invention is shown (referring to a first side-view direction in FIG. 2A). In FIG. 2B, the light-emitting unit 10 and the lens module 20 are separated for the ease of illustration and may also be joined together upon actual requirements. The light-emitting unit 10 is disposed on one side of the lens module 20, and those skilled in the art can also dispose the light-emitting unit 10 in the lens module 20, i.e., the lens module 20 wraps the light-emitting unit 10. The light-emitting unit 10 is used for generating a plurality of lights, and has a light exit axis 10*a* representing the main traveling direction of the lights generated by the light-emitting unit 10. The light-emitting unit 10 may be, for example, a light-emitting diode, incandescent lamp, or gas discharge lamp.

The lens module 20 has a light entrance surface 20*a* and a light exit surface 20*b*. The light exit surface 20*b* has a third curved surface 23 and a fourth curved surface 24 with different curvatures. The first borderline 30 between the third curved surface 23 and the fourth curved surface 24 passes through the light exit axis 10*a* or offsets from the light exit axis 10*a*. In other words, the first borderline 30 does not have to be aligned with the light exit axis 10*a*. The light entrance surface 20*a* receives the lights and forms different illumination ranges with the lights output from the light exit surfaces 20*b* according to the varied curvatures. The illumination ranges can be adjusted by changing the curvatures of the light exit surface 20*b*. The third curved surface 23 has a third optical axis 23*a*, and a third angle 23*b* is formed between the third optical axis 23*a* and the light exit axis 10*a*. The third optical axis 23*a* is defined by the output light intensity distribution of the third curved surface 23, for example, the direction represented by the peak value of the output light intensity of the third curved surface 23. The fourth curved surface 24 has a fourth optical axis 24*a*, and a fourth angle 24*b* is formed between the fourth optical axis 24*a* and the light exit axis 10*a*. The fourth optical axis 24*a* is defined by the output light intensity distribution of the fourth curved surface 24, for example, the direction represented by the peak value of the output light intensity of the fourth curved surface 24. The third angle 23*b* formed between the third optical axis 23*a* and the light exit axis 10*a* is smaller than the fourth angle 24*b* formed between the fourth optical axis 24*a* and the light exit axis 10*a*. The lens module 20 is made of a light transmissive material, such as glass, plastic, silica gel, or water, and is thus light in weight and small in size.

Figure 2D:
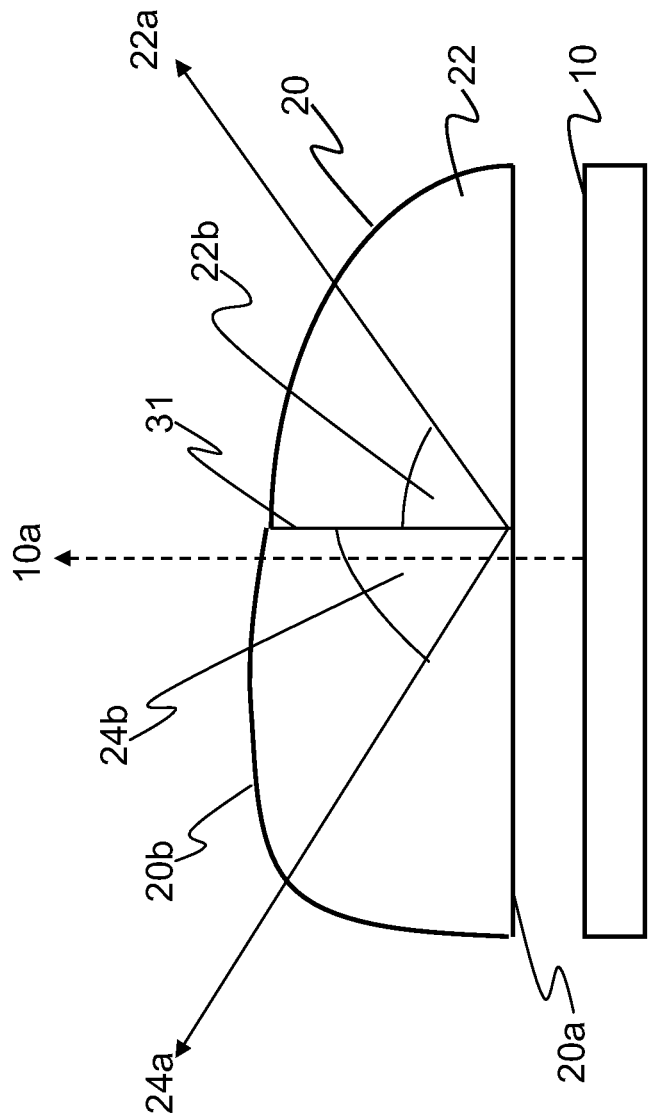
FIG. 2D is another second side view of the second embodiment of the present invention.

Referring to FIG. 2C, a second side view of the second embodiment of the present invention is shown (referring to a second side-view direction in FIG. 2A). In FIG. 2C, the light-emitting unit 10 and the lens module 20 are separated for the ease of illustration and may also be joined together upon actual requirements. The second curved surface 22 is separated from the fourth curved surface 24 by the second borderline 31. The second borderline 31 between the second curved surface 22 and the adjacent fourth curved surface 24 passes through the light exit axis 10*a* or offsets from the light exit axis 10*a*. In other words, the second borderline 31 does not have to be aligned with the light exit axis 10*a* (as shown in FIG. 2D). The second angle 22*b* formed between the second optical axis 22*a* and the light exit axis 10*a* is smaller than the fourth angle 24*b* formed between the fourth optical axis 24*a* and the light exit axis 10*a*.

Figure 3A:
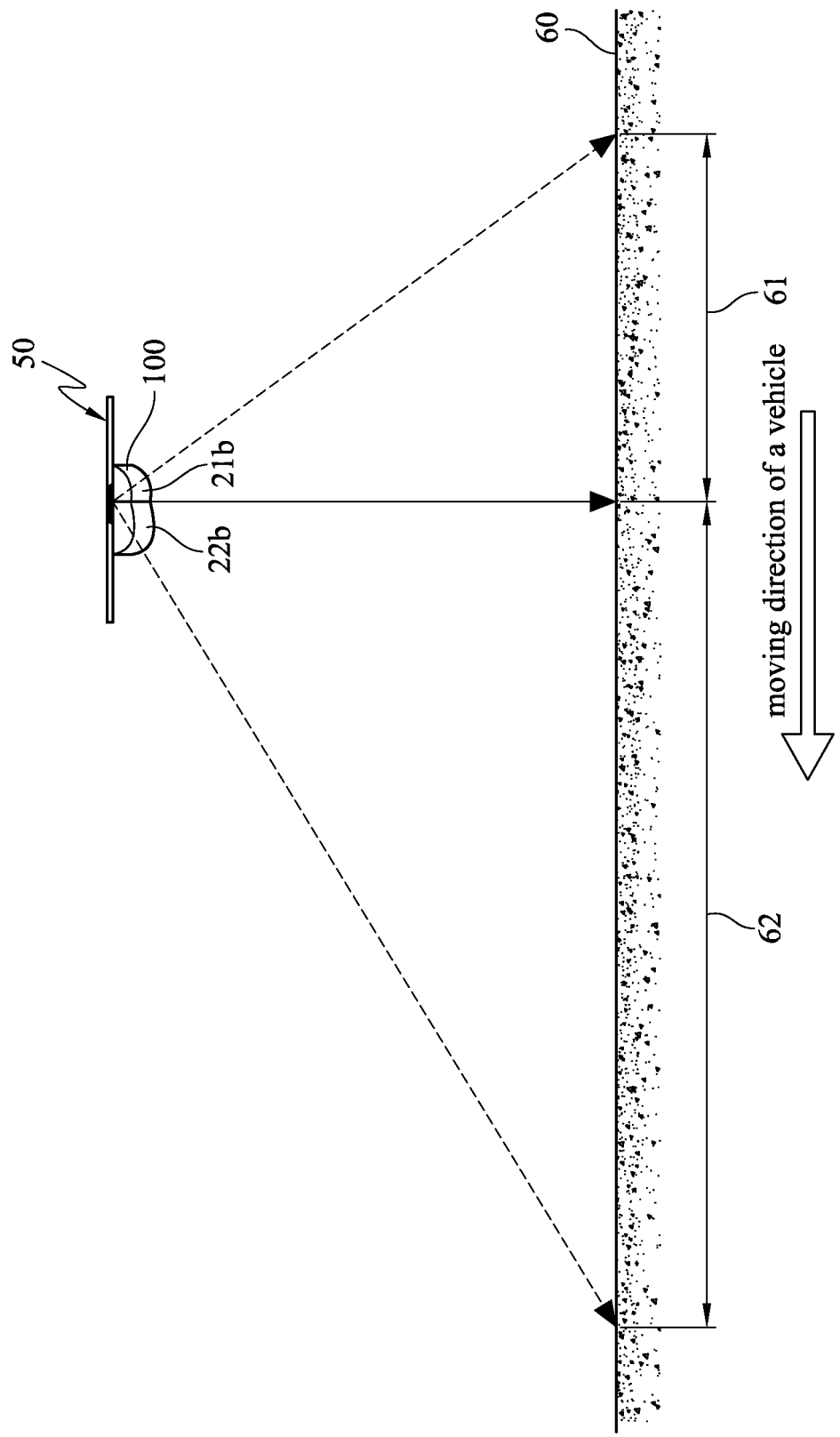
FIG. 3A is a schematic view illustrating a illumination range according to the first embodiment of the present invention.

Referring to FIG. 3A, a schematic view illustrating a illumination range according to the first embodiment of the present invention is shown. In FIG. 3A, the illumination apparatus 100 of the present invention is disposed on a fixed lamppost 50 for illuminating a roadway 60.

The illumination apparatus 100 forms a first illumination range 61 and a second illumination range 62 on the roadway 60 corresponding to the first curved surface 21 and the second curved surface 22. Vehicles on the roadway 60 first travel through the first illumination range 61 and then the second illumination range 62. As the first illumination range 61 is an illumination light source of a small angle (for example, 30° to 45°), the light may not be directly irradiated into the visual field of the driver. Thus, the glare problem can be eliminated. Moreover, the second illumination range 62 is an illumination light source of a large angle (for example, 50° to 70°).

Thereby, when the vehicle enters the second illumination range 62, the driver has already turned his back to the illumination light source and will not be affected by the glare problem. Besides, the second illumination range 62 provides an illumination range covering a longer distance, so as to improve the street lighting efficiency.

Figure 3B:
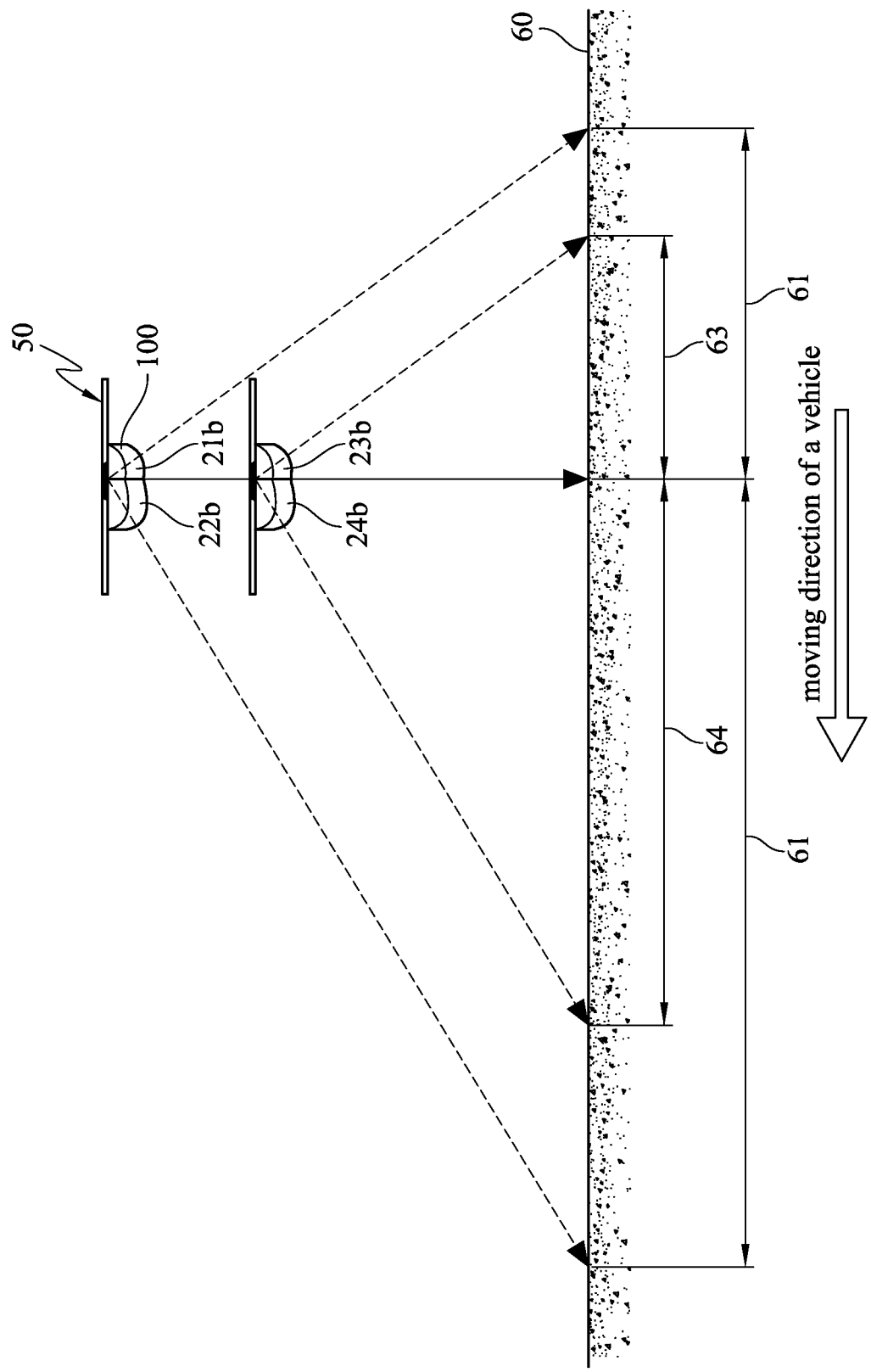
FIG. 3B is a schematic view illustrating a illumination range according to the second embodiment of the present invention.

Referring to FIG. 3B, a schematic view illustrating a illumination range according to the second embodiment of the present invention is shown. In FIG. 3B, the illumination apparatus 100 of the present invention is disposed on a fixed lamppost 50 for illuminating a roadway 60. In order to easily show the differences between the illumination ranges, the illumination apparatus 100 in FIG. 3B is disassembled, and the actual illumination apparatus 100 is shown in FIG. 2A.

The illumination apparatus 100 forms a first illumination range 61 and a third illumination range 63 on the roadway 60 respectively corresponding to the first curved surface 21 and the third curved surface 23, and forms a second illumination range 62 and a fourth illumination range 64 on the roadway 60 respectively corresponding to the second curved surface 22 and the fourth curved surface 24. Vehicles on the roadway 60 first travel through the first illumination range 61 and the third illumination range 63 and then through the second illumination range 62 and the fourth illumination range 64. As the first illumination range 61 and the third illumination range 63 are illumination light sources of a small angle (for example, 30° to 45°), the light may not be directly irradiated into the visual field of the driver. Thus, the glare problem can be eliminated. Moreover, the second illumination range 62 and the fourth illumination range 64 are illumination light sources of a large angle (for example, 60° to 70°). Thereby, when the vehicle enters the second illumination range 62 and the fourth illumination range 64, the driver has already turned his back to the illumination light source and will not be affected by the glare problem. Besides, the second illumination range 62 and the fourth illumination range 64 provide an illumination range covering a longer distance, so as to improve the street lighting efficiency.

Figure 4A:
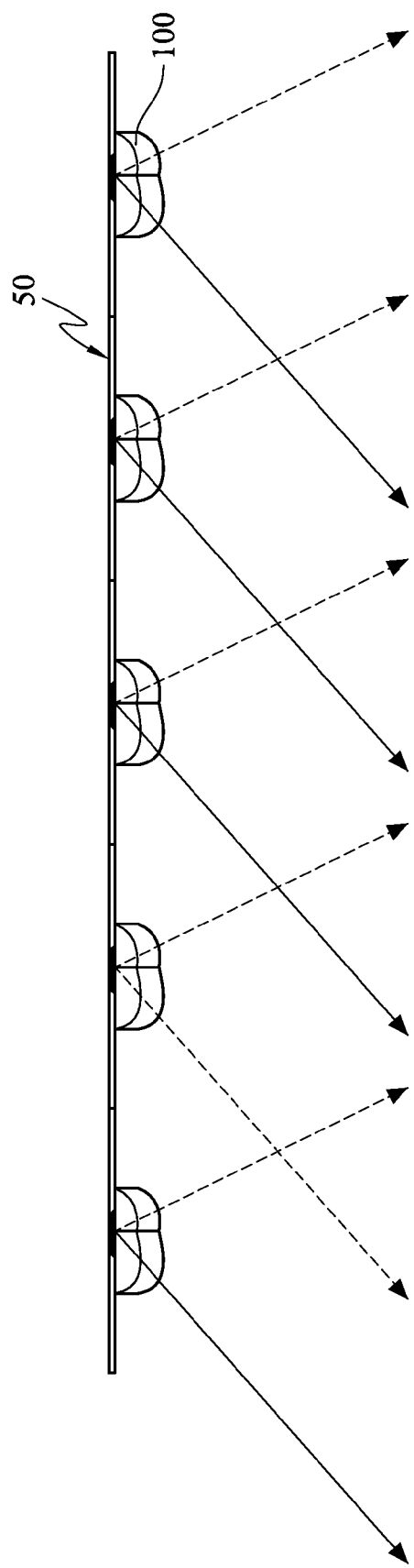
FIG. 4A is a schematic view of a third embodiment of the present invention.

Referring to FIG. 4A, a schematic view of a third embodiment of the present invention is shown. In FIG. 4A, a plurality of illumination apparatus 100 is mounted on a fixed lamppost 50 to enhance the luminance.

Figure 4B:
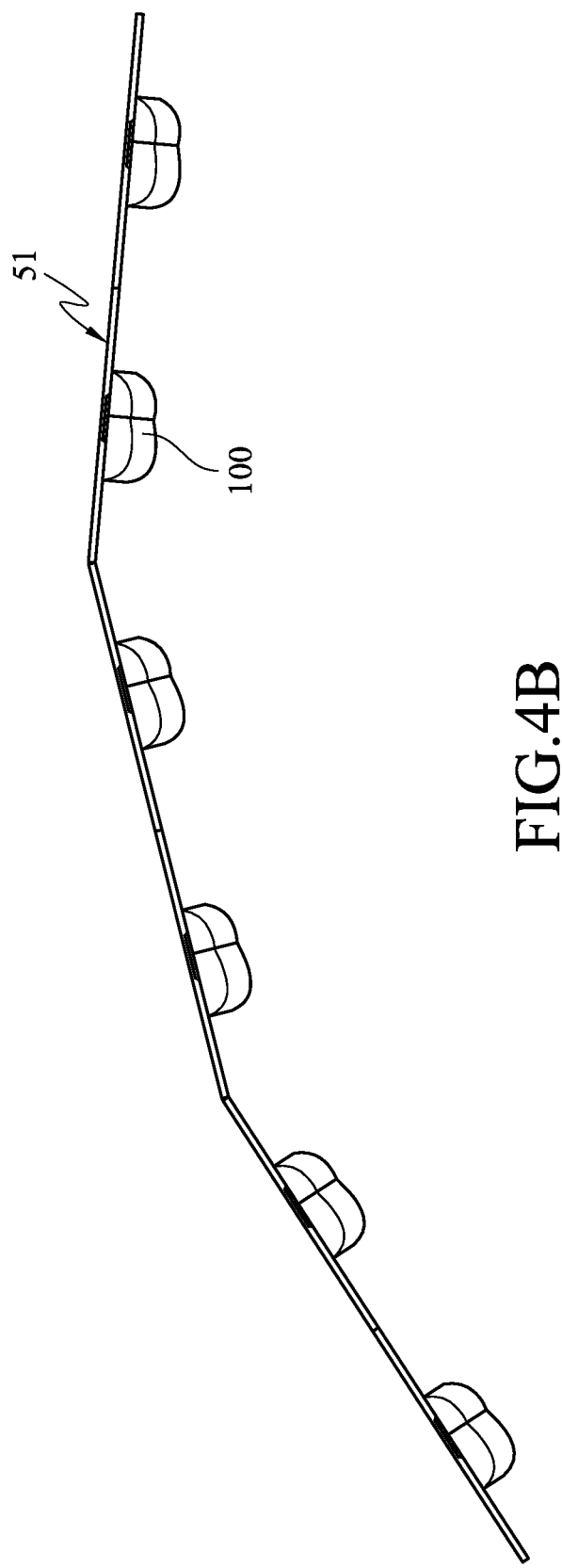
FIG. 4B is a schematic view of a fourth embodiment of the present invention.

Referring to FIG. 4B, a schematic view of a fourth embodiment of the present invention is shown. In FIG. 4B, a plurality of illumination apparatus 100 is mounted on a bent lamppost 51 to enhance the luminance and adjust the illumination angle.

Figure 5A:
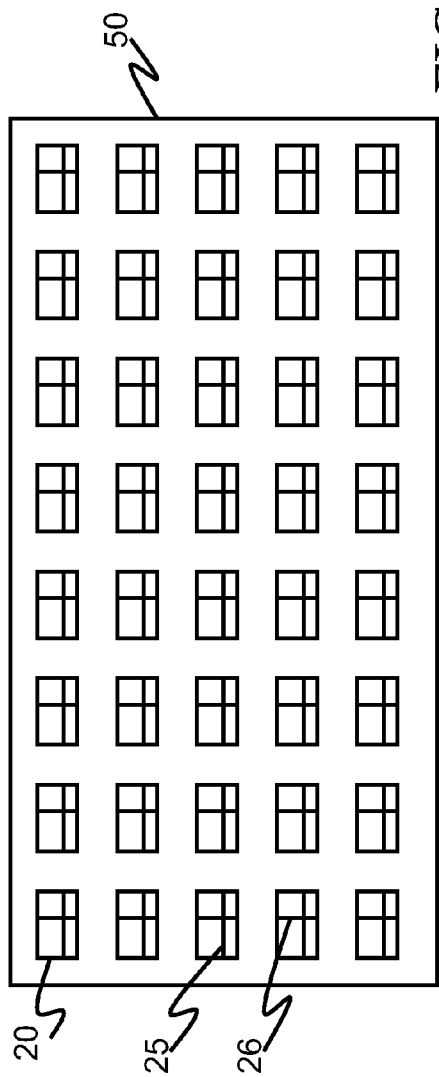
FIG. 5A is a schematic view of a fifth embodiment of the present invention.

Referring to FIG. 5A, a schematic view of a fifth embodiment of the present invention is shown. In FIG. 5A, a plurality of illumination apparatus 100 is arranged in an array on a fixed lamppost 50 (or a bent lamppost 51). Further, those skilled in the art may also dispose a plurality of illumination apparatus 100 arranged in an array on a substrate made of, for example, metal, plastic, glass, silicon, or ceramics. The light-emitting unit and the lens module in each illumination apparatus 100 are disposed correspondingly.

The lens modules 20 are arranged in an array. Each of the lens modules 20 is approximately rectangular with a major axis 25 and a minor axis 26, and the major axis 25 is perpendicular to the minor axis 26. The major axes 25 of the lens modules 20 in each column are parallel to the major axes 25 of the lens modules 20 in each row, and the minor axes 26 of the lens modules 20 in each column are parallel to the minor axes 26 of the lens modules 20 in each row.

Figure 5B:
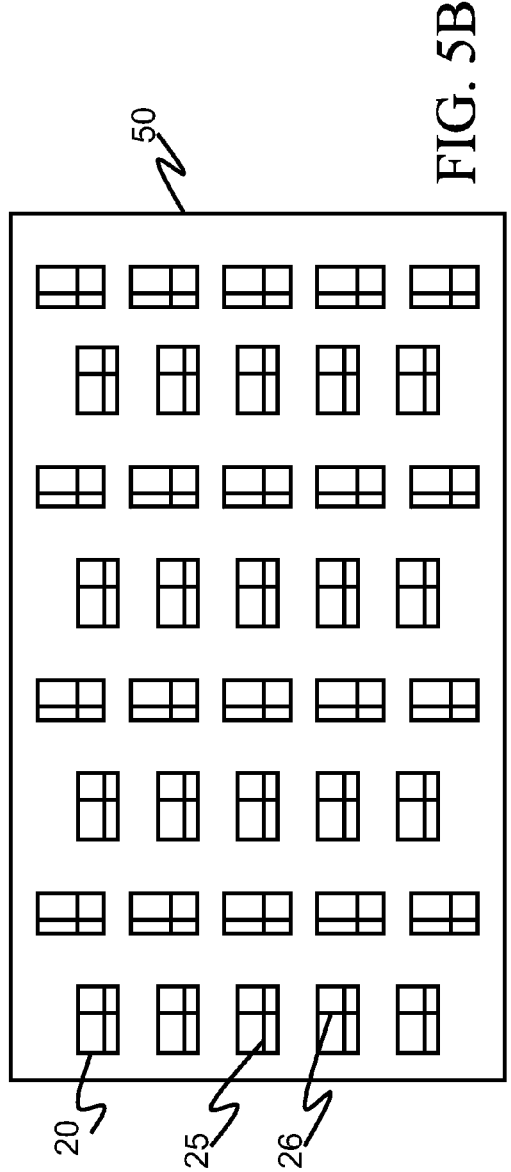
FIG. 5B is a schematic view of a sixth embodiment of the present invention.

Referring to FIG. 5B, a schematic view of a sixth embodiment of the present invention is shown. In FIG. 5B, a plurality of illumination apparatus 100 is arranged in an array on a fixed lamppost 50 (or a bent lamppost 51). Further, those skilled in the art may also dispose a plurality of illumination apparatus 100 arranged in an array on a substrate made of, for example, metal, plastic, glass, silicon, or ceramics. The light-emitting unit and the lens module in each illumination apparatus 100 are disposed correspondingly.

The lens modules 20 are arranged in an array. Each of the lens modules 20 is approximately rectangular with a major axis 25 and a minor axis 26, and the major axis 25 is perpendicular to the minor axis 26. The major axes 25 of the lens modules 20 in the odd columns are parallel to each other and further perpendicular to the major axes 25 of the lens modules 20 in the even columns.

Figure 5C:
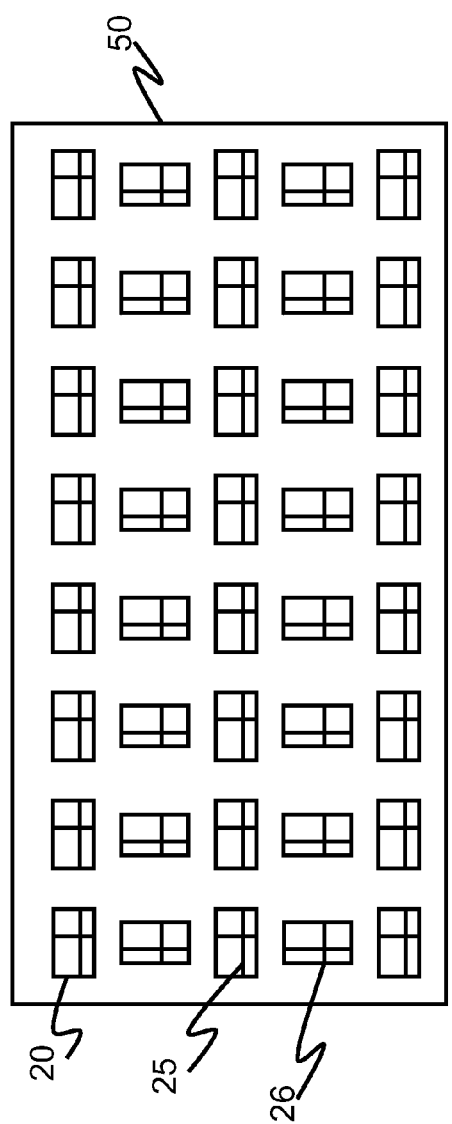
FIG. 5C is a schematic view of a seventh embodiment of the present invention.

Referring to FIG. 5C, a schematic view of a seventh embodiment of the present invention is shown. In FIG. 5C, a plurality of illumination apparatus 100 is arranged in an array on a fixed lamppost 50 (or a bent lamppost 51). Further, those skilled in the art may also dispose a plurality of illumination apparatus 100 arranged in an array on a substrate made of, for example, metal, plastic, glass, silicon, or ceramics. The light-emitting unit and the lens module in each illumination apparatus 100 are disposed correspondingly.

The lens modules 20 are arranged in an array. Each of the lens modules 20 is approximately rectangular with a major axis 25 and a minor axis 26, and the major axis 25 is perpendicular to the minor axis 26. The major axes 25 of the lens modules 20 in the odd rows are parallel to each other and further perpendicular to the major axes 25 of the lens modules 20 in the even rows.

Figure 5D:
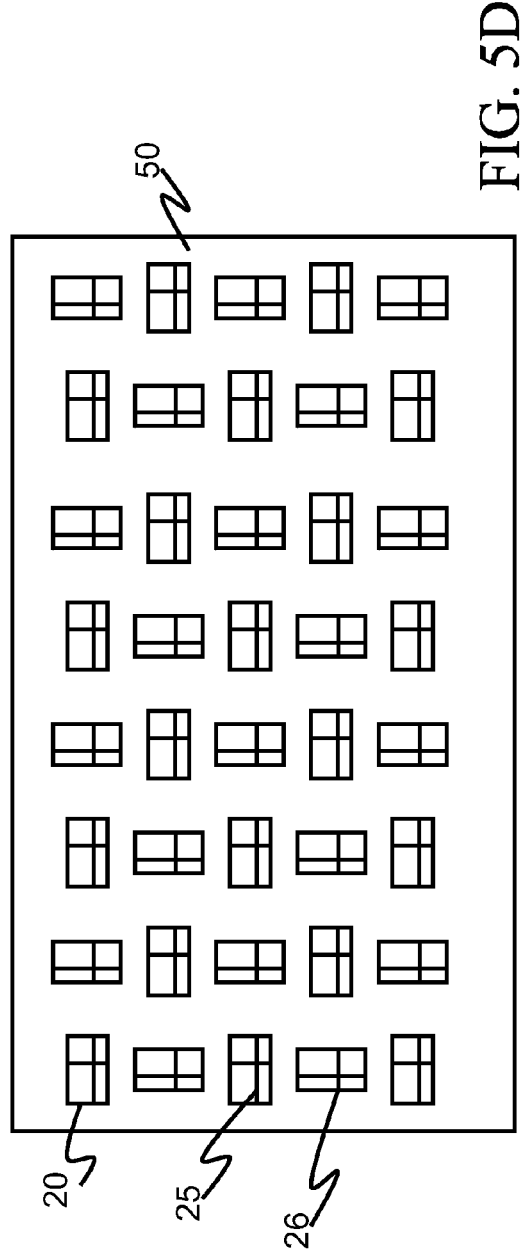
FIG. 5D is a schematic view of an eighth embodiment of the present invention.

Referring to FIG. 5D, a schematic view of an eighth embodiment of the present invention is shown. In FIG. 5D, a plurality of illumination apparatus 100 is arranged in an array on a fixed lamppost 50 (or a bent lamppost 51). Further, those skilled in the art may also dispose a plurality of illumination apparatus 100 arranged in an array on a substrate made of, for example, metal, plastic, glass, silicon, or ceramics. The light-emitting unit and the lens module in each illumination apparatus 100 are disposed correspondingly.

The lens modules 20 are arranged in an array. Each of the lens modules 20 is approximately rectangular with a major axis 25 and a minor axis 26, and the major axis 25 is perpendicular to the minor axis 26. The major axes 25 of the lens modules 20 in the odd columns are perpendicular to the major axes 25 of the lens modules 20 in the even columns, and the major axes 25 of the lens modules 20 in the odd rows are perpendicular to the major axes 25 of the lens modules 20 in the even rows.

In view of the above, according to the illumination apparatus of the present invention, a lens package structure with various curvatures is combined with a light-emitting unit, so as to reduce the weight and volume of the illumination apparatus. Moreover, the lens package structure with various curvatures can be used to provide illumination ranges at different angles.

What is claimed is:
1. An illumination apparatus, comprising:
a light-emitting unit, for generating a light, and having a light exit axis; and
a lens module, having a light exit surface with a plurality of curved surfaces, for receiving the light and outputting the light from the curved surfaces, the curved surfaces further comprising:
an asymmetric first curved surface and a first optical axis indicating a first peak value of output light intensity of the first curved surface; and an asymmetric second curved surface and a second optical axis indicating a second peak value of output light intensity of the second curved surface;

wherein a first angle, formed between the first optical axis and the light exit axis, is smaller than a second angle formed between the second optical axis and the light exit axis; and wherein the light-emitting unit and the lens module form a first illumination range and a second illumination range respectively corresponding to the first curved surface and the second curved surface, and a vehicle moving past the illumination apparatus would travel through the first illumination range and then through the second illumination range.

2. The illumination apparatus as claimed in claim 1, wherein the light-emitting unit and the lens module are disposed on a lamppost, for illuminating a roadway and forming said first illumination range and said second illumination range on the roadway respectively corresponding to the first curved surface and the second curved surface, and vehicles on the roadway first travel through the first illumination range and then the second illumination range.

3. The illumination apparatus as claimed in claim 2, wherein the lamppost is a fixed lamppost or a bent lamppost.

4. The illumination apparatus as claimed in claim 1, wherein a first borderline and an adjacent second borderline of the curved surfaces of the lens module are crossed, and a plurality of curved surfaces with different curvatures is disposed on both sides of the first borderline and the second borderline.

5. The illumination apparatus as claimed in claim 4, wherein the curved surfaces further comprise a third curved surface, and a fourth curved surface, the third curved surface has a third optical axis, the fourth curved surface has a fourth optical axis, and a third angle formed between the third optical axis and the light exit axis is smaller than a fourth angle formed between the fourth optical axis and the light exit axis.

6. The illumination apparatus as claimed in claim 5, wherein the light-emitting unit and the lens module are disposed on a lamppost, for illuminating a roadway and forming the first illumination range, the second illumination range, a third illumination range, and a fourth illumination range on the roadway respectively corresponding to the first curved surface, the second curved surface, the third curved surface, and the fourth curved surface, and vehicles on the roadway first travel through the first and the third illumination range and then the second and the fourth illumination range.

7. The illumination apparatus as claimed in claim 6, wherein the lamppost is a fixed lamppost or a bent lamppost.

8. The illumination apparatus as claimed in claim 1, wherein the light-emitting unit is a light-emitting diode (LED), incandescent lamp, or gas discharge lamp.

9. An illumination apparatus, comprising:
a plurality of light-emitting units, each for generating a light and having a light exit axis; and
a plurality of lens modules, arranged in an array, each corresponding to one of the light-emitting units and having a light exit surface with a plurality of curved surfaces, wherein the lens modules receive the light and output the light from the curved surfaces, the curved surfaces further comprising:
an asymmetric first curved surface and a first optical axis indicating a first peak value of output light intensity of the first curved surface; and
an asymmetric second curved surface and a second optical axis indicating a second peak value of output light intensity of the second curved surface;
wherein a first angle, formed between the first optical axis and the light exit axis, is smaller than a second angle formed between the second optical axis and the light exit axis wherein the light-emitting unit and the lens module form a first illumination range and a second illumination range respectively corresponding to the first curved surface and the second curved surface, and an vehicle moving past the illumination apparatus would travel through the first illumination range and then through the second illumination range.

10. The illumination apparatus as claimed in claim 9, wherein each of the lens modules is approximately rectangular with a major axis and a minor axis, and the major axes of the lens modules in each column are parallel to the major axes of the lens modules in each row.

11. The illumination apparatus as claimed in claim 9, wherein each of the lens modules is approximately rectangular with a major axis and a minor axis, and the major axes of the lens modules in the odd columns are parallel to each other and further perpendicular to the major axes of the lens modules in the even columns.

12. The illumination apparatus as claimed in claim 9, wherein each of the lens modules is approximately rectangular with a major axis and a minor axis, and the major axes of the lens modules in the odd rows are parallel to each other and further perpendicular to the major axes of the lens modules in the even rows.

13. The illumination apparatus as claimed in claim 9, wherein each of the lens modules is approximately rectangular with a major axis and a minor axis, the major axes of the lens modules in the odd columns are perpendicular to the major axes of the lens modules in the even columns, and the major axes of the lens modules in the odd rows are perpendicular to the major axes of the lens modules in the even rows.

* * * * *